US010302992B2

United States Patent
Liu et al.

(10) Patent No.: US 10,302,992 B2
(45) Date of Patent: May 28, 2019

(54) DISPLAY APPARATUS, DISPLAY SYSTEM HAVING THE SAME, AND IMAGE DISPLAY METHOD THEREOF

(71) Applicant: BOE TECHNOLOGY GROUP CO., LTD., Beijing (CN)

(72) Inventors: Jiantao Liu, Beijing (CN); Wenbo Li, Beijing (CN); Xuewen Lv, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 70 days.

(21) Appl. No.: 15/513,270

(22) PCT Filed: Aug. 26, 2016

(86) PCT No.: PCT/CN2016/096853
§ 371 (c)(1),
(2) Date: Mar. 22, 2017

(87) PCT Pub. No.: WO2017/156985
PCT Pub. Date: Sep. 21, 2017

(65) Prior Publication Data
US 2018/0231832 A1 Aug. 16, 2018

(30) Foreign Application Priority Data

Mar. 18, 2016 (CN) .......................... 2016 1 0159242

(51) Int. Cl.
*G02F 1/1335* (2006.01)
*G02F 1/1333* (2006.01)
(Continued)

(52) U.S. Cl.
CPC ....... *G02F 1/133528* (2013.01); *G02B 26/08* (2013.01); *G02B 27/0172* (2013.01);
(Continued)

(58) Field of Classification Search
CPC .......................... G02B 27/0172; G02B 27/017; G02B 26/08; G02B 27/0977; G06F 3/013; G02F 1/133528; G02F 1/1343; G02F 1/1347
See application file for complete search history.

(56) References Cited

U.S. PATENT DOCUMENTS 6,031,588 A * 2/2000 Dultz ...................... A61F 9/023
345/7
6,094,283 A * 7/2000 Preston ..................... G03H 1/28
345/8
(Continued)

FOREIGN PATENT DOCUMENTS

CN 1440513 A 9/2003
CN 1613025 A 5/2005
(Continued)

OTHER PUBLICATIONS

First Office Action in the Chinese Patent Application No. 201610159242.4, dated Aug. 8, 2017; English translation attached.
(Continued)

*Primary Examiner* — Hoan C Nguyen
(74) *Attorney, Agent, or Firm* — Intellectual Valley Law, P.C.

(57) ABSTRACT

The present application discloses a display apparatus including an image display portion for displaying an image, the image display portion emitting display light along a light propagating direction; and a light modulator assembly having a first light modulator and a second light modulator arranged in series along the light propagating direction. The second light modulator has at least a reflective optical state. The first light modulator is switchable between the reflective optical state and a transmissive optical state and is on a side of the second light modulator proximal to the image display portion. A total number of light modulators including the second light modulator and any light modulator on a side of
(Continued)

the second light modulator proximal to the image display portion is N, N is an integer≥2.

18 Claims, 9 Drawing Sheets

(51) Int. Cl.
    *G02B 26/08*     (2006.01)
    *G02B 27/01*     (2006.01)
    *G02B 27/09*     (2006.01)
    *G02F 1/1343*     (2006.01)
    *G02F 1/1347*     (2006.01)
    *G02B 5/30*     (2006.01)
    *G02C 7/12*     (2006.01)
    *G02B 5/26*     (2006.01)
    *G02C 7/14*     (2006.01)
    *G02B 5/20*     (2006.01)
    *G02B 5/28*     (2006.01)

(52) U.S. Cl.
    CPC ....... *G02B 27/0977* (2013.01); *G02F 1/1343* (2013.01); *G02F 1/1347* (2013.01); *G02F 1/133345* (2013.01); *G02F 1/133553* (2013.01); *G02F 1/133555* (2013.01); *G02B 5/20* (2013.01); *G02B 5/201* (2013.01); *G02B 5/26* (2013.01); *G02B 5/28* (2013.01); *G02B 5/30* (2013.01); *G02B 2027/0134* (2013.01); *G02B 2027/0138* (2013.01); *G02B 2027/0178* (2013.01); *G02C 7/12* (2013.01); *G02C 7/14* (2013.01); *G02F 2001/13478* (2013.01); *G02F 2001/133342* (2013.01); *G02F 2001/133557* (2013.01)

(56) References Cited

U.S. PATENT DOCUMENTS

| | | | |
|---|---|---|---|
| 9,223,139 | B2 | 12/2015 | Kress et al. |
| 9,316,832 | B2* | 4/2016 | Levin ................. G02B 27/0172 |
| 2003/0122732 | A1 | 7/2003 | Shaw |
| 2015/0042896 | A1* | 2/2015 | Lee ........................ G02F 1/1347 |
| | | | 348/790 |
| 2015/0269784 | A1* | 9/2015 | Miyawaki ............ G02B 27/017 |
| | | | 345/633 |
| 2015/0370075 | A1* | 12/2015 | Ato ....................... G02B 27/017 |
| | | | 359/240 |

FOREIGN PATENT DOCUMENTS

| | | |
|---|---|---|
| CN | 101593473 A | 12/2009 |
| CN | 101943848 A | 1/2011 |
| CN | 101963703 A | 2/2011 |
| CN | 103885184 A | 6/2014 |
| CN | 104216120 A | 12/2014 |
| CN | 104937476 A | 9/2015 |
| CN | 105589202 A | 5/2016 |
| CN | 205404964 U | 7/2016 |
| WO | 2015190311 A1 | 12/2015 |

OTHER PUBLICATIONS

International Search Report & Written Opinion dated Dec. 22, 2016 regarding PCT/CN2016/096853.

* cited by examiner

| 1 | 2 | 3 | 4 | 5 | 6 | 7 |

| ① | 2 | 3 | 4 | 5 | 6 | 7 |

| 1 | 2 | 3 | 4 | 5 | 6 | ⑦ |

DISPLAY APPARATUS, DISPLAY SYSTEM HAVING THE SAME, AND IMAGE DISPLAY METHOD THEREOF

CROSS-REFERENCE TO RELATED APPLICATION

This application is a national stage application under 35 U.S.C. § 371 of International Application No. PCT/CN2016/096853, filed Aug. 26, 2016, which claims priority to Chinese Patent Application No. 201610159242.4, filed Mar. 18, 2016, the contents of which are incorporated by reference in the entirety.

TECHNICAL FIELD

The present invention relates to a display apparatus, a display system having the same, and an image display method thereof.

BACKGROUND

In recent years, development of wearable devices has become a focus of research in display technology. Various types of wearable devices have been introduced. Among them, smart glasses have been receiving attention by consumers. Smart glasses are sometimes called head-mounted displays. For example, Google glasses display a camera input on lens of the glasses, and combine augmented reality with an image photographed by a camera.

SUMMARY

In some embodiments, the present invention provides a display apparatus comprising an image display portion for displaying an image, the image display portion emitting display light along a light propagating direction; and a light modulator assembly comprising a first light modulator and a second light modulator arranged in series along the light propagating direction; the second light modulator having at least a reflective optical state; and the first light modulator being switchable between the reflective optical state and a transmissive optical state and being on a side of the second light modulator proximal to the image display portion; a total number of light modulators including the second light modulator and any light modulator on a side of the second light modulator proximal to the image display portion is N, N is an integer≥2.

Optionally, the N light modulators comprise N liquid crystal panels, each of the N liquid crystal panels comprises a first polarizer, a first transparent electrode, a liquid crystal layer, a second transparent electrode and a second polarizer laminated in order; the second polarizer is a reflective polarizer disposed on a side of the first polarizer distal to the image display portion.

Optionally, the first polarizer has a first transmission axis, the second polarizer has a second transmission axis, the first transmission axis being substantially perpendicular to the second transmission axis; a direction of a long axis of liquid crystal molecules in the liquid crystal layer is spirally twisted by approximately 90 degrees between the first transparent electrode and the second transparent electrode absent of electric field; and a direction of a long axis of liquid crystal molecules proximal to the first transparent electrode is substantially parallel to the first transmission axis, and a direction of a long axis of liquid crystal molecules proximal to the second transparent electrode is substantially parallel to the second transmission axis, absent of electric field, the first polarizer has a first transmission axis, the second polarizer has a second transmission axis, the first transmission axis being substantially parallel to the second transmission axis; and a long axis of liquid crystal molecules in the liquid crystal layer is substantially parallel to the first transmission axis and the second transmission axis.

Optionally, the light modulator assembly comprises a plurality of curved liquid crystal panels concave toward the image display portion; at least one of the plurality of curved liquid crystal panels has a first light focus point substantially coincident with a first view region; and at least one of the plurality of curved liquid crystal panels has a second light focus point substantially coincident with a second view region; the second view region different from the first view region.

Optionally, the N light modulators comprise N microelectromechanical systems (MEMSs), each of the N MEMSs comprises a plurality of rotatable reflectors.

Optionally, the plurality of rotatable reflectors of a MEMS have a substantially the same tilt angle with respect to the light propagating direction when the MEMS is in the reflective optical state.

Optionally, the light modulator assembly comprises a plurality of MEMSs, at least a first one of the plurality of MEMSs has a first light focus point substantially coincident with a first view region; and at least a second one of the plurality of MEMSs has a second light focus point substantially coincident with a second view region; the second view region being different from the first view region.

Optionally, the light modulator assembly comprises a plurality of MEMSs, each of the plurality of MEMSs comprises an array of rotatable reflectors corresponding to an array of pixels in the image display portion; reflectors in odd columns of the array of rotatable reflectors has a first light focus point substantially coincident with a first view region; and reflectors in even columns of the array of rotatable reflectors has a second light focus point substantially coincident with a second view region; the second view region being different from the first view region.

In another aspect, the present invention provides an image display method using a display apparatus described herein, comprising separating a frame of image into N sub-images; dividing a frame time period into N time windows corresponding to the N sub-images, respectively; and configuring the N light modulators so that a y-th light modulator is in the reflective optical state in a x-th time window, and any light modulator on a side of the y-th light modulator proximal to the image display portion is in the transmissive optical state; wherein N is an integer≥2; x is an integer, 1≤x≤N; y is an integer, 1≤y≤N; and y=1 for the light modulator most proximal to the image display portion.

Optionally, the light modulator assembly is configured so that substantially no more than one light modulator reflects the display light at a time.

Optionally, the step of separating the frame of image into N sub-images comprises separating the frame of image into N sub-images along a width direction of the frame of image.

Optionally, the step of separating the frame of image into N sub-images comprises separating the frame of image into a first sub-image corresponding to a first view region and a second sub-image corresponding to a second view region.

Optionally, the step of separating the frame of image into N sub-images comprises separating the frame of image into N portions along a width direction of the frame of image; and further separating each of the N portions into a first sub-image corresponding to a first view region and a second sub-image corresponding to a second view region.

Optionally, the step of configuring the N light modulators comprises configuring the N light modulator so that the y-th light modulator is in the reflective optical state when a j-th sub-image is displayed in the x-th time window, y equals to N−j+1, j is an integer, and 1≤j≤N.

Optionally, the N light modulators comprise N liquid crystal panels, each of the N liquid crystal panels comprises a first polarizer, a first transparent electrode, a liquid crystal layer, a second transparent electrode and a second polarizer laminated in order; the second polarizer is a reflective polarizer disposed on a side of the first polarizer distal to the image display portion; and the step of configuring the N light modulators comprises controlling an electric field between the first transparent electrode and the second transparent electrode.

Optionally, the first polarizer has a first transmission axis, the second polarizer has a second transmission axis, the first transmission axis being substantially perpendicular to the second transmission axis; a direction of a long axis of liquid crystal molecules in the liquid crystal layer is spirally twisted by approximately 90 degrees between the first transparent electrode and the second transparent electrode when electric field is not applied; and a direction of a long axis of liquid crystal molecules proximal to the first transparent electrode is substantially parallel to the first transmission axis, and a direction of a long axis of liquid crystal molecules proximal to the second transparent electrode is substantially parallel to the second transmission axis, when electric field is not applied; each of the N liquid crystal panels is in the reflective optical state when there is no electric field between the first transparent electrode and the second transparent electrode; each of the N liquid crystal panels is in the transmissive optical state when a strength of the electric field is larger than a threshold value.

Optionally, the first polarizer has a first transmission axis, the second polarizer has a second transmission axis, the first transmission axis being substantially parallel to the second transmission axis; and a long axis of liquid crystal molecules in the liquid crystal layer is substantially parallel to the first transmission axis and the second transmission axis.

Optionally, the N light modulators comprise N MEMSs, each of the N MEMSs comprises a plurality of rotatable reflectors; and the step of configuring the N light modulators comprises rotating the plurality of rotatable reflectors of a MEMS to change tilt angles of the plurality of rotatable reflectors.

Optionally, the plurality of rotatable reflectors of the MEMS are rotated to have a substantially the same tilt angle with respect to the light propagating direction so that the MEMS is in the reflective optical state; the display light reflected by the plurality of rotatable reflectors has a substantially the same propagating direction.

Optionally, the light modulator assembly comprises a plurality of MEMSs, a plurality of rotatable reflectors of at least a first one of the plurality of MEMSs are rotated to have a first light focus point substantially coincident with a first view region; and a plurality of rotatable reflectors of at least a second one of the plurality of MEMSs are rotated to have a second light focus point substantially coincident with a second view region; the second view region being different from the first view region.

Optionally, the light modulator assembly comprises a plurality of MEMSs, each of the plurality of MEMSs comprises an array of rotatable reflectors corresponding to an array of pixels in the image display portion; reflectors in odd columns of the array of rotatable reflectors are rotated to have a first light focus point substantially coincident with a first view region; and reflectors in even columns of the array of rotatable reflectors are rotated to have a second light focus point substantially coincident with a second view region; the second view region being different from the first view region.

Optionally, the method further comprises enhancing brightness of at least one of the N sub-images so that sub-images displayed in light modulators distal to the image display portion have a higher brightness than sub-images displayed in light modulators proximal to the image display portion.

BRIEF DESCRIPTION OF THE FIGURES

The following drawings are merely examples for illustrative purposes according to various disclosed embodiments and are not intended to limit the scope of the present invention.

DETAILED DESCRIPTION

Figure 1:
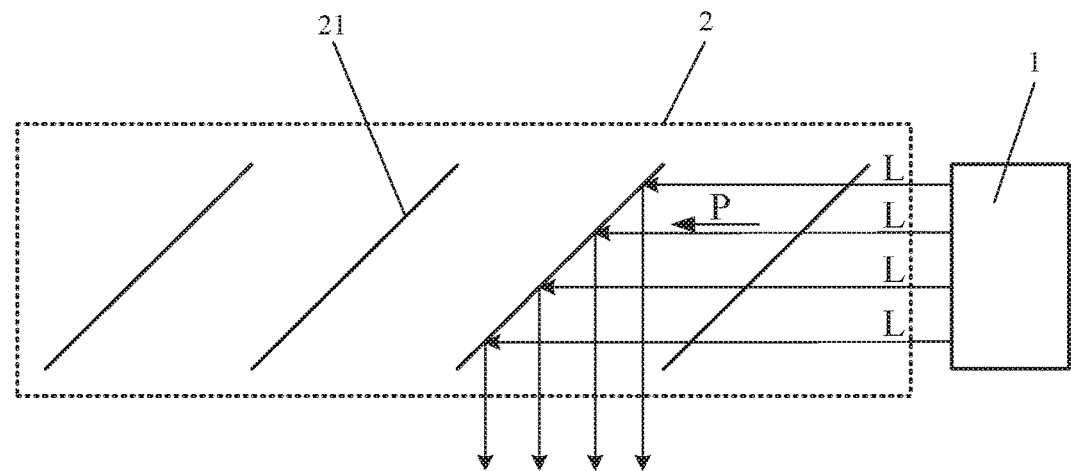
FIG. 1 is a diagram illustrating the structure of a display apparatus in some embodiments.

The disclosure will now describe more specifically with reference to the following embodiments. It is to be noted that the following descriptions of some embodiments are presented herein for purpose of illustration and description only. It is not intended to be exhaustive or to be limited to the precise form disclosed.

Conventional smart glasses systems typically include an image display module and an image conversion module for image display. In the conventional smart glasses systems, both the image display module and the image conversion module have a width larger than a width of a displayed image in order to display a complete frame of image. Limited by this requirement, the conventional smart glasses systems typically have a large thickness. Miniaturized designs are difficult to be implemented in such conventional smart glasses systems.

The present disclosure provides a display apparatus, a display system having the same, and an image display method thereof that substantially obviate one or more of the problems due to limitations and disadvantages of the related art. In some embodiments, the present display apparatus includes an image display portion for displaying an image, the image display portion emitting display light along a light propagating direction; and a light modulator assembly including a first light modulator and a second light modulator arranged in series along the light propagating direction. The second light modulator has at least a reflective optical state. The first light modulator is switchable between the reflective optical state and a transmissive optical state, and is on a side of the second light modulator proximal to the image display portion. A total number of light modulators including the second light modulator and any light modulator on a side of the second light modulator proximal to the image display portion is N, N is an integer≥2. Optionally, any light modulator on a side of the second light modulator proximal to the image display portion is switchable between the reflective optical state and a transmissive optical state.

Optionally, the present display apparatus includes an image display portion for displaying an image; the image display portion emitting display light along a light propagating direction; and a light modulator assembly including N light modulators arranged in series along the light propagating direction; N is an integer≥2; a light modulator most distal to the image display portion having a reflective optical state; and all other light modulators being switchable between a reflective optical state and a transmissive optical state.

In some embodiments, the present image display method includes separating a frame of image into N sub-images; dividing a frame time period into N time windows corresponding to the N sub-images, respectively; and configuring the N light modulators so that a y-th light modulator is in the reflective optical state in a x-th time window, and any light modulator on a side of the y-th light modulator proximal to the image display portion is in the transmissive optical state; wherein N is an integer≥2; x is an integer, 1≤x≤N; y is an integer, 1≤y≤N; and y=1 for the light modulator most proximal to the image display portion.

As used herein, the term "transmissive optical state" in the context of a light modulator means that the light modulator is in a state that allows incident light to pass through. As used herein, the term "reflective optical state" in the context of a light modulator means that the light modulator is in a state that reflects incident light. As used herein, the term "light modulator" refers to a device that receives light and is capable of controlling the flow or characteristics of light such as the direction, a degree of transmission or reflection, etc. Optionally, when a light modulator is in a transmissive optical state, it substantially does not reflect incident light, i.e., the light modulator is substantially transmissive. Optionally, when a light modulator is in a reflective optical state, it substantially does not allow incident light to pass through, i.e., the light modulator is substantially reflective. Optionally, the light modulator's modulation on the incident light is substantially wavelength-independent (e.g., it does not selectively reflect specific wavelengths of the incident light while passing other wavelengths of the incident light). Optionally, the light modulator's modulation on the incident light is not based on Bragg selectivity. Optionally, when a light modulator is in a reflective optical state, light reflected by the light modulator has a substantially the same wavelength as the incident light.

Figure 2:
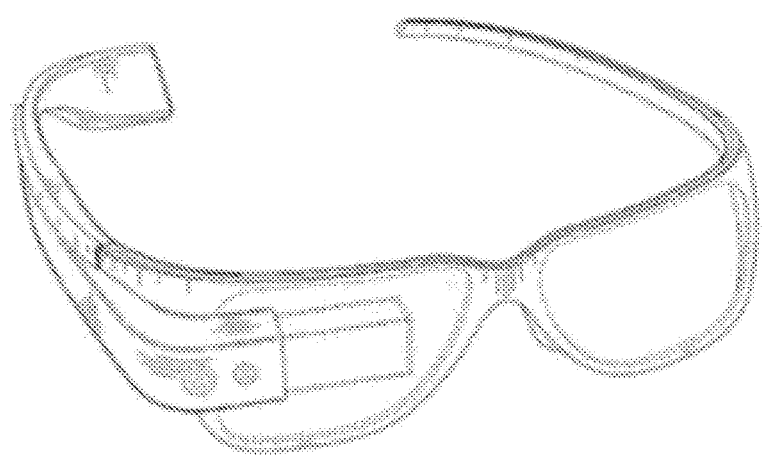
FIG. 2 is a diagram illustrating a smart glasses system in some embodiments.

FIG. 1 is a diagram illustrating a displaying sequence of multiple sub-images in some embodiments. Referring to FIG. 1, the display apparatus in the embodiment includes an image display portion 1 for displaying an image, and a light modulator assembly 2. As shown in FIG. 2, the image display portion 1 emits display light L along a light propagating direction P. The light modulator assembly 2 includes N light modulators 21 arranged in series along the light propagating direction P (distal to light emitting surface of the image display portion 1). N is an integer≥2. In some embodiments, the light modulator 21 has one or more of optical states selected from a reflective optical state and a transmissive optical state. Optionally, a light modulator 21 most distal to the image display portion (the light modulator 21 on the left side of FIG. 1) has a reflective optical state, and all other light modulators 21 are switchable between a reflective optical state and a transmissive optical state. Optionally, the light modulator 21 most distal to the image display portion is also switchable between a reflective optical state and a transmissive optical state. Optionally, the light modulator 21 most distal to the image display portion has only one optical state, i.e., the reflective optical state. When a light modulator 21 is switchable between a reflective optical state and a transmissive optical state, the switching process is reversible, i.e., the light modulator 21 is reversibly switchable between the reflective optical state and the transmissive optical state. Optionally, 2≤N≤5.

In some embodiments, the display apparatus is a smart glasses system (see, e.g., the smart glasses system as shown in FIG. 2). The smart glasses system includes an image display portion, a light modulator assembly, as well as a frame and lenses. In some embodiments, the display apparatus is a hand-held display apparatus, a household display apparatus, or an outdoor display apparatus. Examples of appropriate display apparatuses include, but are not limited to, a television, a monitor, and a gaming system. The present display apparatus has the advantages of having a smaller size and being energy efficient.

Various appropriate image display portions may be used for making the present display apparatus. Examples of image display portions include, but are not limited to, a light emitting diode (LED) display module, an organic light emitting display (OLED) module, a quantum dot display module, and a laser scan display module.

By having a light modulator assembly including N light modulators (N is an integer≥2) in the present display apparatus, a frame of image may be separated into N sub-images during image display, and a frame time period may be divided into N time windows corresponding to the N sub-images. Accordingly, each of the N sub-images may be displayed in a different time window. For example, when the x-th sub-image is displayed, a light modulator corresponding to the x-th sub-image is configured to be in a reflective optical state, whereas any light modulator on a side of the light modulator for displaying the x-th sub-image proximal to the image display portion is configured to be in a transmissive optical state. For example, any light modulator in a light path between the image display portion and the light modulator for displaying the x-th sub-image is configured to be is a transmissive optical state so that the display light may pass through from the image display portion to the light modulator for displaying the x-th sub-image, and the display light is reflected by the light modulator for displaying the x-th sub-image to an eye or a view point. Each of the N sub-images are displayed in a time window. Due to persistence of vision, human eyes can perceive a complete frame of image when a set of sub-images are displayed in quick succession. Accordingly, in some embodiments, a frame of image may be separated into N sub-images along a width direction of the frame of image. As a result, image display of a complete frame of image may be achieved by using an image display portion having a width corresponding to only a width of one sub-image (rather than the width of an entire frame of image). By having this design, the thickness of the image display portion may be reduced, resulting in a miniaturized display apparatus.

Various appropriate light modulators may be used for making the present display apparatus. Examples of appropriate light modulators include, but are not limited to, electro-optic type light modulators (e.g., liquid crystal), electromechanical type light modulators, electrochromic type light modulators, and other types of light modulators such as a plansmonic nano-antenna (see, e.g., U.S. Pat. No. 9,285,611, the contents of which are incorporated herein by reference in its entirety). In some embodiments, light modulators include liquid crystal panels and micro-electromechanical system (MEMS). Examples of liquid crystal panels include a liquid crystal on silicon (LCOS) using ferroelectric liquid crystals. Examples of MEMSs include micro mirror array systems such as a digital micro-mirror device. These light modulators modulate light by digitally switching ON and OFF light. Optionally, the light modulator is a reflective light modulator that does not have a transmissive optical state (e.g., a light modulator most distal to the image display portion). Examples of reflective light modulator further include reflective thin film transistor based liquid crystal display.

Optionally, the light modulator assembly includes N light modulators of a same type and having a substantially the same structure. Optionally, different types of light modulators may be used in the light modulator assembly.

Figure 3:
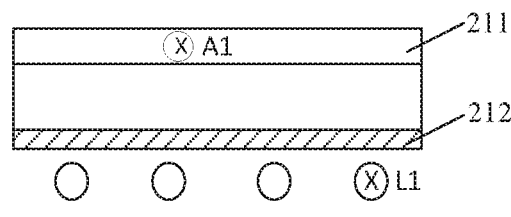
FIG. 3 is a diagram illustrating the structure of a liquid crystal panel in some embodiments.
Figure 3:
Figure 4:
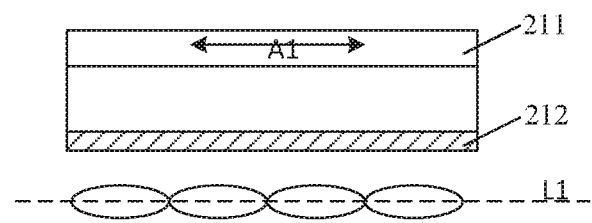
FIG. 4 is a diagram illustrating the structure of a liquid crystal panel in some embodiments.
Figure 4:
Figure 4:
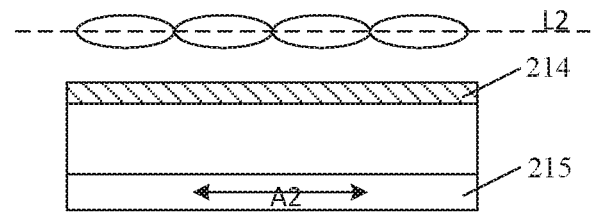

In some embodiments, the light modulator is a liquid crystal panel. FIG. 3 is a diagram illustrating the structure of a liquid crystal panel in some embodiments. FIG. 4 is a diagram illustrating the structure of a liquid crystal panel in some embodiments. Referring to FIG. 3 and FIG. 4, the liquid crystal panels in the embodiments include a first polarizer 211, a first transparent electrode 212, a liquid crystal layer 213, a second transparent electrode 214 and a second polarizer 215 laminated in order; the second polarizer 215 is a reflective polarizer disposed on a side of the first polarizer 211 distal to the image display portion. The reflective polarizer 215 is a polarizer that is capable of reflecting light having a polarization direction perpendicular to a transmission axis of the reflective polarizer 215. Optionally, the reflective polarizer 215 is made by forming a reflective layer on a polarizer. Optionally, the first transparent electrode 212 and the second transparent electrode 214 are both plate electrodes, obviating a need for patterning the first transparent electrode 212 and the second transparent electrode 214 and simplifying the fabricating process of the liquid crystal panel.

Various embodiments of liquid crystal panels capable of switching between a reflective optical state and a transmissive optical state may be use for making the present display apparatus. Similarly, the transmission axes of the first polarizer and the second polarizer in the liquid crystal panel may have various relative orientation to achieve bi-optical states or an intermediate optical state. Accordingly, liquid crystal molecules in the liquid crystal layer have various initial orientation depending on the relative orientation of the transmission axes.

In some embodiments, the first polarizer has a first transmission axis, the second polarizer has a second transmission axis, the first transmission axis is substantially perpendicular to the second transmission axis. Optionally, a direction of a long axis of liquid crystal molecules in the liquid crystal layer is spirally twisted by approximately 90 degrees between the first transparent electrode and the second transparent electrode when electric field is not applied. As shown in FIG. 3, the first polarizer 211 has a first transmission axis A1, the second polarizer has a second transmission axis A2, A1 and A2 being substantially perpendicular to each other. When an electric field is not applied between the first transparent electrode 212 and the second transparent electrode 214, a direction of a long axis of liquid crystal molecules proximal to the first transparent electrode 212 (annotated as "L1" in FIG. 3) is substantially parallel to the first transmission axis A1, and a direction of a long axis of liquid crystal molecules proximal to the second transparent electrode 214 (annotated as "L2" in FIG. 3) is substantially parallel to the second transmission axis A2.

When an electric field is not applied between the first transparent electrode 212 and the second transparent electrode 214, the liquid crystal molecules in the liquid crystal layer 213 maintain an initial orientation as shown in FIG. 3. The display light emitted from the image display portion includes a component having a polarization direction substantially parallel to the transmission axis A1, which is capable of passing through the first polarizer 211. The light passing through the first polarizer 211 travels through the liquid crystal layer 213, during which the polarization direction of the light is rotated by 90 degrees. As a result, the rotated polarization direction becomes substantially parallel to the transmission axis A2 of the second polarizer 215, and the light passed through the second polarizer 215. In this embodiment, the liquid crystal panel is in a transmissive optical state.

When an electric field is applied between the first transparent electrode 212 and the second transparent electrode 214, the liquid crystal molecules in the liquid crystal layer 213 reorient so that the long axis of liquid crystal molecules has a different orientation. In some embodiments, a strength of the electric field between the first transparent electrode 212 and the second transparent electrode 214 exceeds a threshold value, the long axis of substantially all liquid crystal molecules in the liquid crystal layer 213 is arranged to be substantially perpendicular to the first transparent electrode 211. The component of the display light emitted from the image display portion having a polarization direction parallel to the transmission axis A1 of the first polarizer 211 passes through the first polarizer 211. The light passing through the first polarizer 211 continues to travel through the liquid crystal layer 213, maintaining its polarization direction unchanged. When the light reaches the second polarizer 215, the polarization direction of the light is substantially perpendicular to the transmission axis A2 of the second polarizer 215. Because the second polarizer 215 is a reflective polarizer, the light is reflected by the second polarizer 215. The reflected light travels through the liquid crystal layer 213 (in a reversed direction), again maintaining it polarization direction unchanged, and emits out of the first polarizer 211. In this embodiment, the liquid crystal panel is in a reflective optical state. The threshold value of the strength of the electric field between the first transparent electrode 212 and the second transparent electrode 214 may be determined based on several factors, e.g., the chemical and physical properties of the liquid crystal molecules, the distance between the first transparent electrode 212 and the second transparent electrode 214.

In some embodiments, the first polarizer has a first transmission axis, the second polarizer has a second transmission axis, and the first transmission axis is substantially parallel to the second transmission axis. Optionally, a long axis of substantially all liquid crystal molecules in the liquid crystal layer is substantially parallel to the first transmission axis and the second transmission axis. As shown in FIG. 4, the first polarizer 211 has a first transmission axis A1, the second polarizer has a second transmission axis A2, A1 and A2 being substantially parallel to each other. When an electric field is not applied between the first transparent electrode 212 and the second transparent electrode 214, a direction of a long axis of substantially all liquid crystal molecules in the liquid crystal layer 213 (see, e.g., the long axis L1 of liquid crystal molecules proximal to the first transparent electrode 212 and the long axis L2 of liquid crystal molecules proximal to the second transparent electrode 214) is substantially parallel to A1 and A2.

When an electric field is not applied between the first transparent electrode 212 and the second transparent electrode 214, the liquid crystal molecules in the liquid crystal layer 213 maintain an initial orientation as shown in FIG. 4. The display light emitted from the image display portion includes a component having a polarization direction substantially parallel to the transmission axis A1, which is capable of passing through the first polarizer 211. The light passing through the first polarizer 211 travels through the liquid crystal layer 213, during which the polarization direction of the light is substantially maintained unchanged. When the light reaches the second polarizer 215, the polarization direction of the light is substantially parallel to the transmission axis A2 of the second polarizer 215. As a result, the light continues to pass through the second polarizer 215. In this embodiment, the liquid crystal panel is in a transmissive optical state.

When an electric field is applied between the first transparent electrode 212 and the second transparent electrode 214, the liquid crystal molecules in the liquid crystal layer 213 reorient so that the long axis of liquid crystal molecules has a different orientation. In some embodiments, a strength of the electric field between the first transparent electrode 212 and the second transparent electrode 214 exceeds a threshold value, the long axis of substantially all liquid crystal molecules in the liquid crystal layer 213 is arranged to be substantially perpendicular to the first transparent electrode 211. The component of the display light emitted from the image display portion having a polarization direction parallel to the transmission axis A1 of the first polarizer 211 passes through the first polarizer 211. The light passing through the first polarizer 211 continues to travel through the liquid crystal layer 213, during which the polarization direction of the light is rotated by 90 degrees. When the light reaches the second polarizer 215, the polarization direction of the light is substantially perpendicular to the transmission axis A2 of the second polarizer 215. Because the second polarizer 215 is a reflective polarizer, the light is reflected by the second polarizer 215. The reflected light travels through the liquid crystal layer 213 (in a reversed direction), during which the polarization direction of the light is again rotated by 90 degrees. When the reflected light travels back to the first polarizer 211, the polarization direction of the reflected light is substantially parallel to the transmission axis of the first polarizer 211, and emits out of the first polarizer 211. In this embodiment, the liquid crystal panel is in a reflective optical state. The threshold value of the strength of the electric field between the first transparent electrode 212 and the second transparent electrode 214 may be determined based on several factors, e.g., the chemical and physical properties of the liquid crystal molecules, the distance between the first transparent electrode 212 and the second transparent electrode 214.

Figure 5:
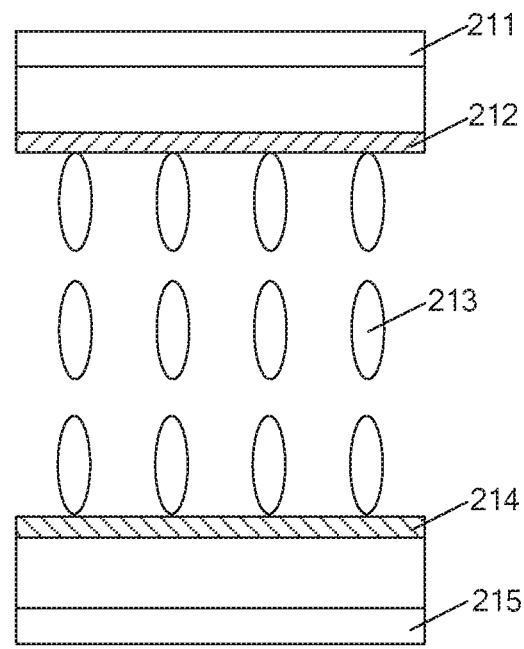
FIG. 5 is a diagram illustrating the structure of a liquid crystal panel in some embodiments.

In some embodiments, when an electric field is not applied between the first transparent electrode and the second transparent electrode, the liquid crystal panel is in a transmissive optical state (as shown in FIG. 4 and FIG. 4). In some embodiments, when an electric field is applied between the first transparent electrode and the second transparent electrode, and the strength of the electric field between the first transparent electrode and the second transparent electrode exceeds a threshold value, the liquid crystal panel is in a reflective optical state (as shown in FIG. 5). When these embodiments are implemented in the present display apparatus, each light modulator is only required to be in the reflective optical state when the light modulator is displaying a corresponding sub-image. In all other time windows, the light modulator may be in the transmissive optical state during which the electric field is not applied to the liquid crystal panel. Thus, the display apparatus having this design is energy efficient.

Numerous alternative structures of the liquid crystal panels may be used. For example, in some embodiments, the liquid crystal panel may include a first polarizer, a first transparent plate electrode, an insulating layer, a liquid crystal layer, a second transparent rod electrode, and a second polarizer laminated in order. Moreover, the transmission axes of the first polarizer and the second polarizer may have various relative orientation (e.g., other than perpendicular to each other and parallel to each other). The liquid crystal molecules in the liquid crystal layer may be designed to have various initial orientation as long as the reflective optical state and the transmissive optical state may be achieved in the liquid crystal panel.

Various appropriate shapes may be used for making the liquid crystal panels. As shown in FIG. 1, the light modulator assembly 2 includes a plurality of flat liquid crystal panels having a plate shape, all of which reflect light towards a substantially the same direction when they are configured in a reflective optical state. In some embodiments, a frame of image is separated into a plurality of sub-images along the width direction of the frame of image, and a frame time period is divided into a plurality of time windows corresponding to the plurality of sub-images, respectively. Optionally, in each time window, a sub-image is displayed, and the display light for display the sub-image is reflected by the liquid crystal panel designated for displaying the sub-image. When the sub-image is displayed and the display light is reflected by the liquid crystal panel designated for the sub-image, any liquid crystal panel on a side of the designated liquid crystal panel proximal to the image display portion is configured to be in a transmissive optical state so that the display light may pass through to the designated liquid crystal panel. When the frame time period corresponding to the frame of image ends, all sub-images of the frame of image are displayed in multiple liquid crystal panels, a complete frame of image may be perceived by an observer (e.g., a human eye).

Figure 6:
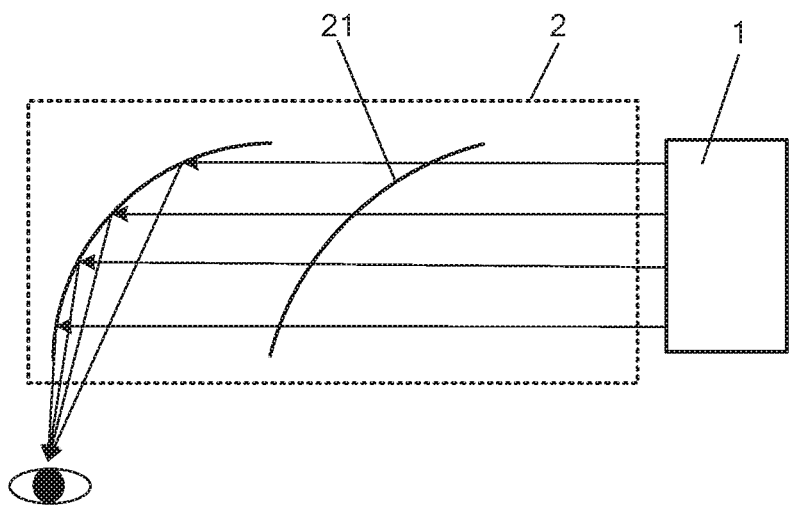
FIG. 6 is a diagram illustrating the structure of a display apparatus in some embodiments.
Figure 7:
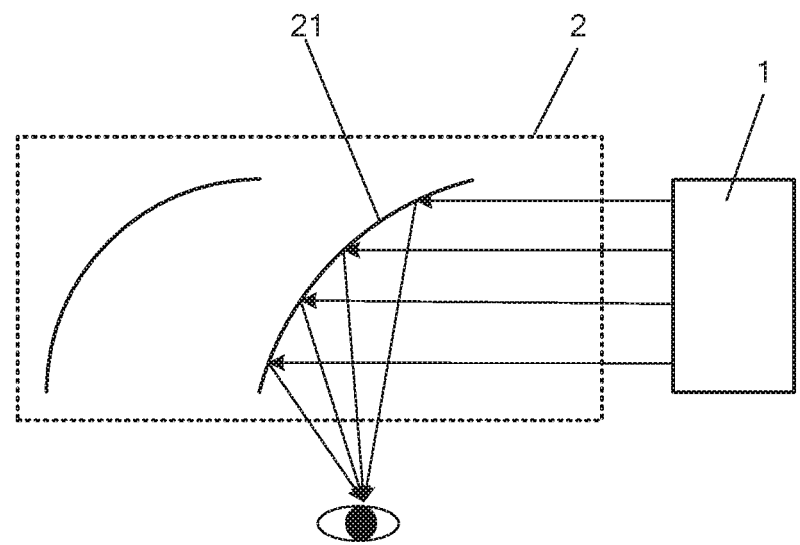
FIG. 7 is a diagram illustrating the structure of a display apparatus in some embodiments.

In some embodiments, the liquid crystal panels are curved liquid crystal panels. FIG. 6 is a diagram illustrating the structure of a display apparatus in some embodiments. FIG. 7 is a diagram illustrating the structure of a display apparatus in some embodiments. Referring to FIG. 6 and FIG. 7, the light modulator assemblies 2 in the embodiments include a plurality of curved liquid crystal panels 21 concave toward the image display portion 1. Optionally, the plurality of curved liquid crystal panels 21 have difference curvature states. Optionally, the plurality of curved liquid crystal panels 21 have a substantially the same curvature state but different tilt angles. Optionally, at least one of the plurality of curved liquid crystal panels 21 has a first light focus point substantially coincident with a first view region, and at least one of the plurality of curved liquid crystal panels 21 has a second light focus point substantially coincident with a second view region; and the second view region different from the first view region. As shown in FIG. 6 and FIG. 7, the first view region (or a first view point) may be a human eye (e.g., a left eye), and the second view region (or a second view point) may be another human eye (e.g., a right eye). Optionally, the first view region (or a first view point) may be a first camera, and the second view region (or a second view point) may be a second camera. When the first and the second view regions correspond to a human's left and right eyes, respectively, naked eye three-dimensional display may be made possible using a miniaturized display apparatus.

Referring to FIG. 7 and FIG. 7, the light modulator assembly 2 includes two curved liquid crystal panels 21 arranged in series along the light propagating direction. As shown in FIG. 6, a first liquid crystal panel 21 (on the left side of the display apparatus) reflects display light from the image display portion 1 to a left eye of a human when the first liquid crystal panel 21 is configured to be in a reflective optical state and the second liquid crystal panel 21 is configured to be in a transmissive optical state. As shown in FIG. 7, a second liquid crystal panel 21 reflects display light from the image display portion 1 to a right eye of a human when the second liquid crystal panel 21 is configured to be in a reflective optical state.

In some embodiments, a frame of image is separated into multiple sub-images each of which corresponding to a view region. For example, a frame of image may be separated into two sub-images, the first sub-image corresponding to a left eye of a human and the second sub-image corresponding to a right eye. Further, a frame time period corresponding to the frame of image is divided into a first time window and a second time window. In the first time window, the first sub-image is displayed. Accordingly, the first liquid crystal panel 21 is configured to be in a reflective optical state and the second liquid crystal panel 21 is configured to be in a transmissive optical state. The display light corresponding to the first sub-image emits from the image display portion 1 is reflected to the left eye (the first view region). In the second time window, the second sub-image is displayed. Accordingly, the second liquid crystal panel 21 is configured to be in a reflective optical state. The display light corresponding to the second sub-image emits from the image display portion 1 is reflected to the right eye (the second view region). When the frame time period corresponding to the frame of image ends, the left eye perceives the first sub-image, and the right eye perceives the second sub-image, thereby realizing the naked eye three-dimensional display.

Figure 8:
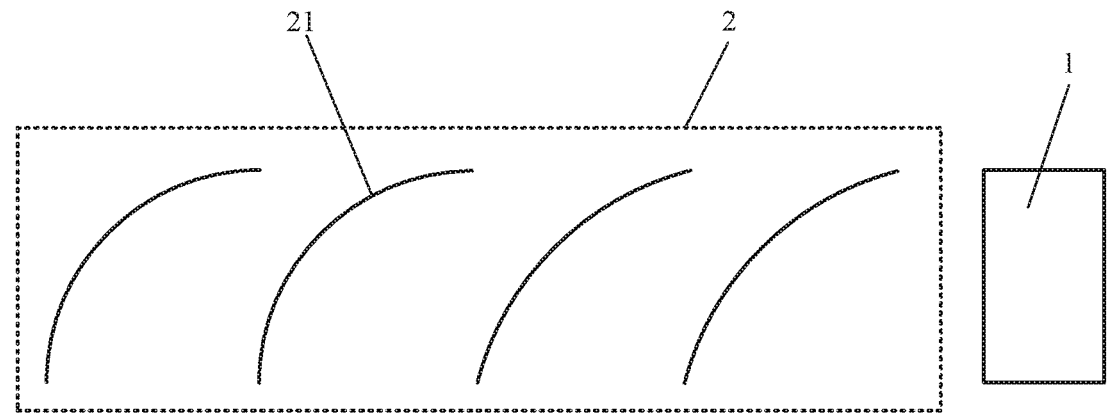
FIG. 8 is a diagram illustrating the structure of a display apparatus in some embodiments.

FIG. 8 is a diagram illustrating the structure of a display apparatus in some embodiments. Referring to FIG. 8, the light modulator assembly 2 in the embodiment includes multiple liquid crystal panels 21 having different curvature states, i.e., a first liquid crystal panel 21, a second liquid crystal panel 21, a third liquid crystal panel 21, and a fourth liquid crystal panel 21 arranged in series along the light propagating direction (sequentially from left to right in FIG. 8). The first liquid crystal panel 21 has a light focus point substantially coincident with a first view region (e.g., the left eye) when the first liquid crystal panel 21 is configured to be in a reflective optical state. The second liquid crystal panel 21 has a light focus point substantially coincident with the first view region (e.g., the left eye) when the second liquid crystal panel 21 is configured to be in a reflective optical state. The third liquid crystal panel 21 has a light focus point substantially coincident with a second view region (e.g., the right eye) when the third liquid crystal panel 21 is configured to be in a reflective optical state. The fourth liquid crystal panel 21 has a light focus point substantially coincident with the second view region (e.g., the right eye) when the fourth liquid crystal panel 21 is configured to be in a reflective optical state.

In some embodiments, a frame of image may be first separated into multiple portions along a width direction of the frame of image, each of which is then further separated into multiple sub-images. For example, a frame of image may be separated into two portions along a width direction of the frame of image, i.e., a first portion and a second portion. Each of the first portion and the second portion is then further separated into a first sub-image corresponding to a first view region (e.g., the left eye) and a second sub-image corresponding to a second view region (e.g., the right eye). Specifically, the first portion is further separated into a first sub-image of the first portion corresponding to the left eye and a second sub-image of the first portion corresponding to the right eye; and the second portion is further separated into a first sub-image of the second portion corresponding to the left eye and a second sub-image of the second portion corresponding to the right eye. Moreover, a frame time period corresponding to the frame of image is divided into four time windows, i.e., a first time window, a second time window, a third time window, and a fourth time window. The first sub-image and the second sub-image of the first portion and the first sub-image and the second sub-image of the second portion may be displayed in the first to fourth time windows in any appropriate order. For example, in some embodiments, the first sub-image of the first portion corresponding to the left eye, the first sub-image of the second portion corresponding to the left eye, the second sub-image of the first portion corresponding to the right eye, and the second sub-image of the second portion corresponding to the right eye, are sequentially displayed in the first to fourth time window by the first to fourth liquid crystal panels, e.g., the display light corresponding to each sub-image is reflected by a designated liquid crystal panel when the designated liquid crystal panel is configured to be in a reflective optical state. When a designated liquid crystal panel is configured to be in a reflective optical state to reflect the display light for a corresponding sub-image, any liquid crystal panel on a side of the designated liquid crystal panel proximal to the image display portion is configured to be in a transmissive optical state. When the frame time period corresponding to the frame of image ends, the left eye perceives the first sub-image of the first portion and the first sub-image of the second portion, and the right eye perceives the second sub-image of the first portion and the second sub-image of the second portion, thereby realizing the naked eye three-dimensional display.

Numerous alternative embodiments may be practiced to implement the naked eye three-dimensional display method described herein. For example, the light modulator assembly may include various numbers of curved liquid crystal panels. The curvature states of the curved liquid crystal panels in various embodiments may be determined by experiment and simulation.

In some embodiments, the light modulators are MEMSs. FIGS. 9-12 illustrate the structures of display apparatuses in various embodiments in which the light modulators are MEMSs. Referring to FIGS. 9-12, each MEMS include a plurality of rotatable reflectors. The rotatable reflectors (thus the MEMS) are configured to have at least two optical states, e.g., a reflective optical state and a transmissive optical state. Optionally, the rotatable reflectors are configured to be in a transmissive optical state to allow the display light passing through. Optionally, the rotatable reflectors are configured to be in a reflective optical state to reflect the display light. Further, the rotatable reflectors in the reflective optical state may be configured to be rotated to different tilt angles so that the display light may be reflected along different directions.

In some embodiments, the rotatable reflectors of a MEMS are rotated to be facing towards the image display portion, and the MEMS is configured to be in the reflective optical state. In some embodiments, the rotatable reflectors of a MEMS are rotated so that planes of substantially all rotatable reflectors are substantially parallel to the light propagating direction, and the MEMS is configured to be in the transmissive optical state.

Figures 13, 14, 15, 16:
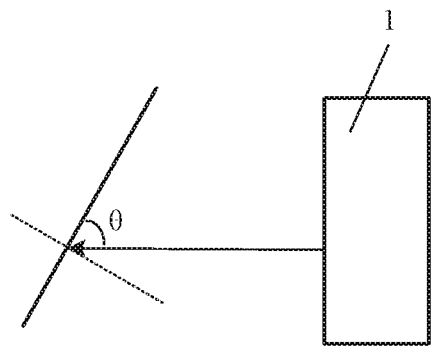
FIG. 13 is a diagram illustrating a tilt angle of a reflector with respect to the light propagating direction in some embodiments.
FIG. 14 is a diagram illustrating separation of a frame of image into multiple sub-images in some embodiments.
FIG. 15 is a diagram illustrating a displaying sequence of multiple sub-images in some embodiments.
FIG. 16 is a diagram illustrating a displaying sequence of multiple sub-images in some embodiments.

When the MEMS is configured to the in the reflective optical state, the display light may be reflected towards different directions if the rotatable reflectors of the MEMS are rotated to have different tilt angles. FIG. 13 is a diagram illustrating a tilt angle of a reflector with respect to the light propagating direction in some embodiments. Referring to FIG. 13, the tilt angle between a plane of the reflector (i.e., the light reflecting surface plane) and the light propagating direction is $\theta$. Accordingly, the direction of the light reflected by the reflector may be adjusted by changing a tilt angle of the reflector.

Figure 9:
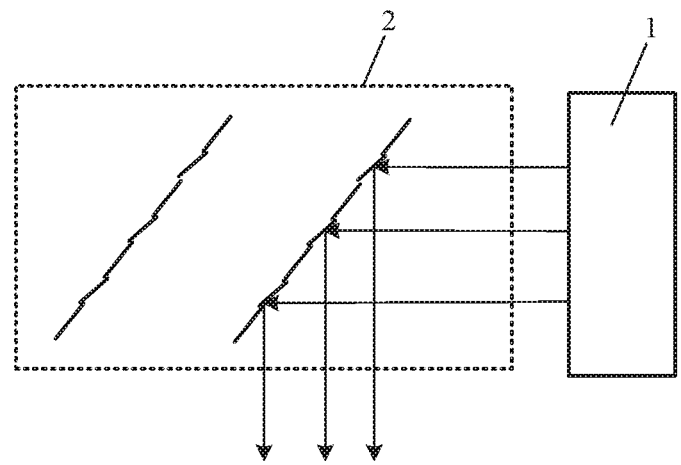
FIG. 9 is a diagram illustrating the structure of a display apparatus in some embodiments.

Referring to FIG. 9, the light modulator assembly 2 in the embodiment includes a plurality of MEMSs. The plurality of rotatable reflectors of each MEMS have a substantially the same tilt angle with respect to the light propagating direction when the MEMS is in the reflective optical state. Thus, when each MEMS reflects the display light, light modulation effects of each MEMS is substantially the same. In some embodiments, a frame of image is separated into multiple sub-images along the width direction of the frame of image, and a frame time period is divided into multiple time windows corresponding to multiple sub-images, respectively, and each sub-image is displayed in each time window. In each time window, a sub-image is displayed, and the display light for display the sub-image is reflected by a MEMS designated for displaying the sub-image. When the sub-image is displayed and the display light is reflected by a MEMS designated for the sub-image, any MEMS on a side of the designated MEMS proximal to the image display portion is configured to be in a transmissive optical state (e.g., the tilt angle is set to zero) so that the display light may pass through to the designated MEMS. When the frame time period corresponding to the frame of image ends, all sub-images of the frame of image are displayed in multiple MEMS, a complete frame of image may be perceived by an observer (e.g., a human eye).

In some embodiments, the light modulator assembly 2 includes a plurality of MEMSs. Some MEMSs (e.g., at least a first one) of the light modulator assembly 2 have a first light focus point substantially coincident with a first view region (e.g., a first view point). Some other MEMSs (e.g., at least a second one) have a second light focus point substantially coincident with a second view region (e.g., a second view point). The second view region is different from the first view region. When the first and the second view regions correspond to a human's left and right eyes, respectively, naked eye three-dimensional display may be made possible using a miniaturized display apparatus.

Figure 10:
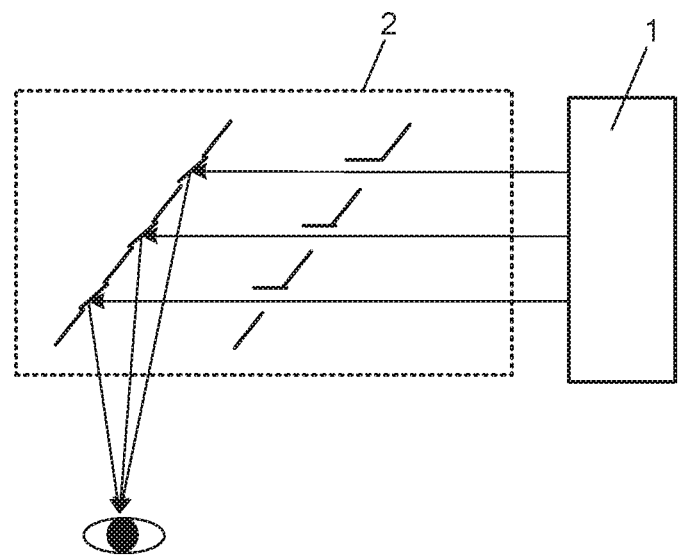
FIG. 10 is a diagram illustrating the structure of a display apparatus in some embodiments.
Figure 11:
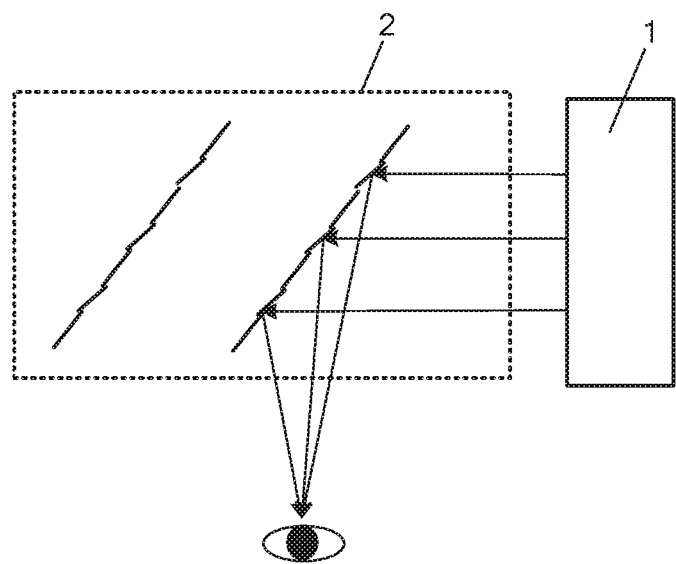
FIG. 11 is a diagram illustrating the structure of a display apparatus in some embodiments.

Referring to FIG. 10 and FIG. 11, the light modulator assembly 2 includes two MEMSs, i.e., a first MEMS and a second MEMS, arranged in series along the light propagating direction. As shown in FIG. 10, a first MEMS (on the left side of the display apparatus) reflects display light from the image display portion 1 to a left eye of a human when the first MEMS is configured to be in a reflective optical state and the second MEMS is configured to be in a transmissive optical state. As shown in FIG. 11, a second MEMS reflects display light from the image display portion 1 to a right eye of a human when the second MEMS is configured to be in a reflective optical state.

In some embodiments, a frame of image is separated into multiple sub-images each of which corresponding to a view region. For example, a frame of image may be separated into two sub-images, the first sub-image corresponding to a left eye of a human and the second sub-image corresponding to a right eye. Further, a frame time period corresponding to the frame of image is divided into a first time window and a second time window. In the first time window, the first sub-image is displayed. Accordingly, the first MEMS is configured to be in a reflective optical state and the second MEMS is configured to be in a transmissive optical state. The display light corresponding to the first sub-image emits from the image display portion 1 is reflected to the left eye (the first view region). In the second time window, the second sub-image is displayed. Accordingly, the second MEMS is configured to be in a reflective optical state. The display light corresponding to the second sub-image emits from the image display portion 1 is reflected to the right eye (the second view region). When the frame time period corresponding to the frame of image ends, the left eye perceives the first sub-image, and the right eye perceives the second sub-image, thereby realizing the naked eye three-dimensional display.

Figure 12:
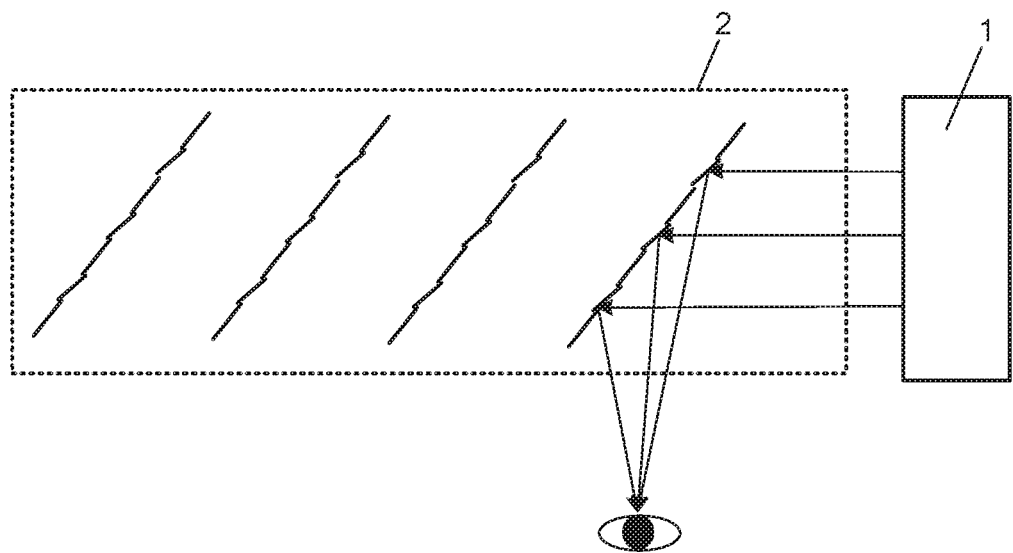
FIG. 12 is a diagram illustrating the structure of a display apparatus in some embodiments.

FIG. 12 is a diagram illustrating the structure of a display apparatus in some embodiments. Referring to FIG. 12, the light modulator assembly 2 in the embodiment includes multiple MEMSs, i.e., a first MEMS, a second MEMS, a third MEMS, and a fourth MEMS arranged in series along the light propagating direction (sequentially from left to right in FIG. 12). The first MEMS has a light focus point substantially coincident with a first view region (e.g., the left eye) when the first MEMS is configured to be in a reflective optical state. The second MEMS has a light focus point substantially coincident with the first view region (e.g., the left eye) when the second MEMS is configured to be in a reflective optical state. The third MEMS has a light focus point substantially coincident with a second view region (e.g., the right eye) when the third MEMS is configured to be in a reflective optical state. The fourth MEMS has a light focus point substantially coincident with the second view region (e.g., the right eye) when the fourth MEMS is configured to be in a reflective optical state.

In some embodiments, a frame of image may be first separated into multiple portions along a width direction of the frame of image, each of which is then further separated into multiple sub-images. For example, a frame of image may be separated into two portions along a width direction of the frame of image, i.e., a first portion and a second portion. Each of the first portion and the second portion is then further separated into a first sub-image corresponding to a first view region (e.g., the left eye) and a second sub-image corresponding to a second view region (e.g., the right eye). Specifically, the first portion is further separated into a first sub-image of the first portion corresponding to the left eye and a second sub-image of the first portion corresponding to the right eye; and the second portion is further separated into a first sub-image of the second portion corresponding to the left eye and a second sub-image of the second portion corresponding to the right eye. Moreover, a frame time period corresponding to the frame of image is divided into four time windows, i.e., a first time window, a second time window, a third time window, and a fourth time window. The first sub-image and the second sub-image of the first portion and the first sub-image and the second sub-image of the second portion may be displayed in the first to fourth time windows in any appropriate order. For example, in some embodiments, the first sub-image of the first portion corresponding to the left eye, the first sub-image of the second portion corresponding to the left eye, the second sub-image of the first portion corresponding to the right eye, and the second sub-image of the second portion corresponding to the right eye, are sequentially displayed in the first to fourth time window by the first to fourth MEMSs, e.g., the display light corresponding to each sub-image is reflected by a designated MEMS when the designated MEMS is configured to be in a reflective optical state. When a designated MEMS is configured to be in a reflective optical state to reflect the display light for a corresponding sub-image, any MEMS on a side of the designated MEMS proximal to the image display portion is configured to be in a transmissive optical state. When the frame time period corresponding to the frame of image ends, the left eye perceives the first sub-image of the first portion and the first sub-image of the second portion, and the right eye perceives the second sub-image of the first portion and the second sub-image of the second portion, thereby realizing the naked eye three-dimensional display.

In some embodiments, the light modulator assembly includes a plurality of MEMS, each of the plurality of MEMSs includes an array of rotatable reflectors corresponding to an array of pixels in the image display portion. Optionally, reflectors in odd columns of the array of rotatable reflectors has a first focus point substantially coincident with a first view region (e.g., a first view point). Optionally, reflectors in even columns of the array of rotatable reflectors has a second focus point substantially coincident with a second view region (e.g., a second view point), the second view region being different from the first view region. When the first and the second view regions correspond to a human's left and right eyes, respectively, naked eye three-dimensional display may be made possible using a miniaturized display apparatus. Optionally, a column direction of the array of rotatable reflectors is substantially parallel to a column direction of the array of pixels in the image display portion.

In some embodiments, the light modulator assembly includes two MEMS arranged in series along the light propagating direction, e.g., a first MEMS and a second MEMS, each of which includes an array of rotatable reflectors corresponding to an array of pixels in the image display portion. In each of the first MEMS and the second MEMS, reflectors in odd columns of the array of rotatable reflectors has a first focus point substantially coincident with a first view region (e.g., the left eye of an observer), and reflectors in even columns of the array of rotatable reflectors has a second focus point substantially coincident with a second view region (e.g., the right eye of an observer). Optionally, a frame time period is divided into two time windows, e.g., a first time window and a second time window. In the first time window, the first sub-image is displayed. The second MEM is configured to be in a transmissive optical state to allow the display light passing through. The first MEMS is configured to be in a reflective optical state. Specifically, the reflectors in odd columns of the array of rotatable reflectors in the first MEMS reflects the display light to the left eye (the first view region), and the reflectors in even columns of the array of rotatable reflectors in the first MEMS reflects the display light to the right eye (the second view region). In the second time window, the second sub-image is displayed. The second MEM is configured to be in a reflective optical state. Specifically, the reflectors in odd columns of the array of rotatable reflectors in the second MEMS reflects the display light to the left eye (the first view region), and the reflectors in even columns of the array of rotatable reflectors in the second MEMS reflects the display light to the right eye (the second view region). When the frame time period corresponding to the frame of image ends, the left eye perceives the sub-images corresponding to the left eye (e.g., reflected by the odd columns), and the right eye perceives the sub-images corresponding to the right eye (e.g., reflected by the even columns), thereby realizing the naked eye three-dimensional display.

Numerous alternative embodiments may be practiced to implement the naked eye three-dimensional display method described herein. For example, the light modulator assembly may include various numbers and structures of MEMSs. The tilt angles of the rotatable reflectors of the MEMS in various embodiments may be determined by experiment and simulation.

In some embodiments, each of the plurality of light modulators has a plate shape. As shown in FIG. 1, each light modulator 21 faces towards the image display portion 1, reflecting the display light emitted from the image display portion into eyes of an observer. Optionally, a plane of the light modulator 21 forms a tilt angle with the light propagating direction. As defined herein, the term "tilt angle" refers to an angle between a surface of the light modulator and the light propagating direction. Optionally, the tilt angle is an angle between a reflective surface of the light modulator and the light propagating direction. Optionally, the light modulator is a liquid crystal panel, and the tilt angle is defined by an angle between a reflective surface of the liquid crystal panel (e.g., the reflective surface of the second polarizer in the liquid crystal panel) and the light propagating direction. Optionally, the light modulator is a MEMS, and the tilt angle is defined by an angle between a reflective surface of the MEMS (e.g., the reflective surface of a reflector) and the light propagating direction (as illustrated in FIG. 13).

In some embodiments, the plurality of light modulators has a substantially the same tilt angle. When the plurality of light modulators have a substantially the same tilt angle, the plurality of sub-images displayed by the plurality of light modulators have a substantially the same image size, achieving a better display effect. In the context of MEMS, when the plurality of light modulators have a substantially the same tilt angle, not only all reflectors in each MEMS have a substantially the same tilt angle with respect to each other, but all MEMS have a substantially the same tilt angle with respect to each other. Optionally, each of the plurality of light modulators has a plate shape, and each of the plurality of light modulators has a tilt angle of approximately 45 degrees. By having this design, the plurality of sub-images displayed by the plurality of light modulators have a substantially the same image size, achieving a better display effect.

In some embodiments, an i-th light modulator is designated to display a sub-image; i is an integer, $1 \leq i \leq (N-1)$; and i=1 for the light modulator most proximal to the image display portion. Optionally, a side of the i-th light modulator distal to the image display portion is aligned with a side of an (i+1)-th light modulator proximal to the image display portion, so that the display light passed through the i-th light modulator when the i-th light modulator is configured to be in a transmissive optical state is substantially reflected by the (i+1)-th light modulator when the (i+1)-th light modulator is configured to be in a reflective optical state. Optionally, when viewed along the light propagating direction, a projection of the i-th light modulator on the (i+1)-th light modulator substantially overlaps with the (i+1)-th light modulator, so that the display light passed through the i-th light modulator when the i-th light modulator is in a transmissive optical state is substantially received by the (i+1)th light modulator when the (i+1)-th light modulator is configured to be in a reflective optical state. By having this design, the plurality of sub-images may be sequentially displayed to achieve a better display quality.

For the display light to reach the last light modulator (e.g., the light modulator most distal to the image display portion), it has to pass through the light modulators between the last light modulator and the image display portion, when the light modulators between the last light modulator and the image display portion are configured to be in transmissive optical state. For example, in some embodiments, the light modulators are a plurality of liquid crystal panels, the last liquid crystal panel is configured to be in the reflective optical state whereas all other liquid crystal panels are configured to be in the transmissive optical state. Even though the intermediate light modulators are configured to be the transmissive optical state, the display light may be partially absorbed when passing through a light modulator in transmissive optical state. In some embodiments, brightness of the light reflected by the last light modulator is enhanced to achieve a more uniform display effect. Optionally, the light modulator most distal to the image display portion includes a brightness enhancing film, e.g., on a side of the light modulator most distal to the image display portion proximal to the image display portion. Examples of the brightness enhancing film include NIPOCS PCF series manufactured by Nitto Denko Corporation and Vicuiti DBFE series manufactured by Sumitomo 3M Ltd.

Similarly, when the display light passes through the first light modulator to the (i−1)-th light modulator to reach the i-th light modulator, the display light may be partially absorbed when passing through the first light modulator to the (i−1)-th light modulator; $1 \leq i \leq (N-1)$; and i=1 for the light modulator most proximal to the image display portion. In some embodiments, brightness of the light reflected by the i-th light modulator is enhanced to achieve a more uniform display effect. Optionally, the i-th light modulator includes a brightness enhancing film, e.g., on a side of the i-th light modulator proximal to the image display portion. For example, the plurality of light modulators are MEMSs, the brightness enhancing film may be disposed on the surface of the plurality of rotatable reflectors, e.g., on a side of the i-th light modulator proximal to the image display portion.

In another aspect, the present disclosure provides a display system having a display apparatus described herein. In some embodiments, the display system further includes a virtual reality touch control apparatus coupled to the display apparatus as described herein. In some embodiments, the display system includes other display apparatuses coupled to the display apparatus as described herein for display sharing.

In another aspect, the present disclosure provides an image display method using a display apparatus as described herein. In some embodiments, the image display method includes separating a frame of image into N sub-images; dividing a frame time period into N time windows corresponding to the N sub-images, respectively, each sub-image is displayed in each time window; and configuring the N light modulators so that a y-th light modulator is in the reflective optical state in a x-th time window, and any light modulator on a side of the y-th light modulator proximal to the image display portion is in the transmissive optical state; wherein N is an integer$\geq 2$; x is an integer, $1 \leq x \leq N$; y is an integer, $1 \leq y \leq N$; and y=1 for the light modulator most proximal to the image display portion. Optionally, x=y. Optionally, x is not the same as y.

By having the present image display method, each of the N sub-images may be displayed in a different time window. For example, when the x-th sub-image is displayed, a light modulator corresponding to the x-th sub-image is configured to be in a reflective optical state, whereas any light modulator on a side of the light modulator for displaying the x-th sub-image proximal to the image display portion is configured to be in a transmissive optical state. For example, any light modulator in a light path between the image display portion and the light modulator for displaying the x-th sub-image is configured to be is a transmissive optical state so that the display light may pass through from the image display portion to the light modulator for displaying the x-th sub-image, and the display light is reflected by the light modulator for displaying the x-th sub-image to an eye or a view point. Each of the N sub-images are displayed in a time window. Due to persistence of vision, human eyes can perceive a complete frame of image when a set of sub-images are displayed in quick succession. Accordingly, in some embodiments, a frame of image may be separated into N sub-images along a width direction of the frame of image. As a result, image display of a complete frame of image may be achieved by using an image display portion having a width corresponding to only a width of one sub-image (rather than the width of an entire frame of image). By having this design, the thickness of the image display portion may be reduced, resulting in a miniaturized display apparatus.

In some embodiments, the step of separating the frame of image into N sub-images includes separating the frame of image into N sub-images along a width direction of the frame of image. In some embodiments, the step of separating the frame of image into N sub-images includes separating the frame of image into a first sub-image corresponding to a first view region (e.g., a first view point) and a second sub-image corresponding to a second view region (e.g., a second view point). In some embodiments, the step of separating the frame of image into N sub-images includes separating the frame of image into N portions along a width direction of the frame of image; and further separating each of the N portion into a first sub-image corresponding to a first view region (e.g., a first view point) and a second sub-image corresponding to a second view region (e.g., a second view point).

In some embodiments, a frame of image is separated into N sub-images, and a frame time period is divided into N time windows corresponding to the N sub-images, respectively. FIG. 14 is a diagram illustrating separation of a frame of image into multiple sub-images in some embodiments. Referring to FIG. 14, a frame of image is separated into seven sub-images.

In some embodiments, the N sub-images include $1^{st}$ to N-th sub-images sequential arranged along the width direction of the frame of image. Optionally, the $1^{st}$ to N-th sub-images are sequentially displayed in $1^{st}$ to N-th time windows. Optionally, the N-th to $1^{st}$ sub-images are sequentially displayed in $1^{st}$ to N-th time windows. FIG. 15 is a diagram illustrating a displaying sequence of multiple sub-images in some embodiments. Referring to FIG. 15, a frame of image is separated into seven sub-images, the sub-image 1 is the first sub-image to be displayed. As shown in FIG. 15, seven sub-images 1 to 7 are sequentially display along the width direction of the frame of image in the first to seventh time windows. FIG. 16 is a diagram illustrating a displaying sequence of multiple sub-images in some embodiments. Referring to FIG. 16, a frame of image is separated into seven sub-images, the sub-image 7 is the first sub-image to be displayed. As shown in FIG. 16, seven sub-images 7 to 1 are sequentially display along the width direction of the frame of image in the first to seventh time windows.

Figure 17:
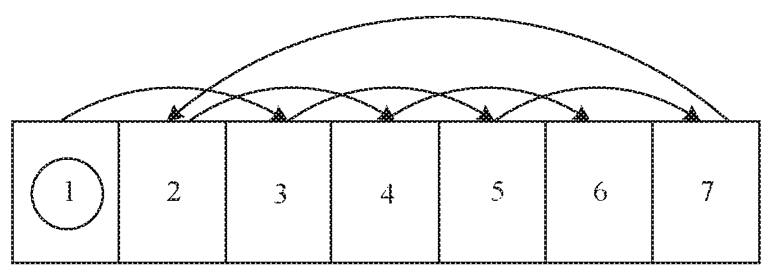
FIG. 17 is a diagram illustrating a displaying sequence of multiple sub-images in some embodiments.
Figure 18:
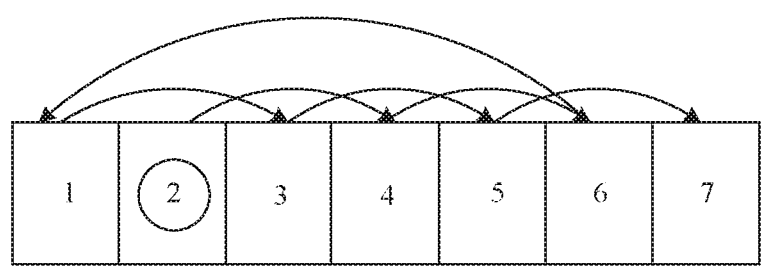
FIG. 18 is a diagram illustrating a displaying sequence of multiple sub-images in some embodiments.

In some embodiments, the N sub-images include $1^{st}$ to N-th sub-images sequential arranged along the width direction of the frame of image; a first group of the N sub-images are displayed before a second group of the N sub-images; the first group and the second group being different groups selected from a group of odd-numbered sub-images and a group of even-numbered sub-images. FIG. 17 is a diagram illustrating a displaying sequence of multiple sub-images in some embodiments. Referring to FIG. 17, a frame of image is separated into seven sub-images, the sub-image 1 is the first sub-image to be displayed. As shown in FIG. 17, the odd-numbered sub-images 1, 3, 5, and 7 are first sequentially displayed in the first to fourth time windows, the even-numbered sub-images 2, 4, and 6 are then sequentially displayed in the fifth to seventh time windows. FIG. 18 is a diagram illustrating a displaying sequence of multiple sub-images in some embodiments. Referring to FIG. 18, a frame of image is separated into seven sub-images, the sub-image 2 is the first sub-image to be displayed. As shown in FIG. 18, the even-numbered sub-images 2, 4, and 6 are first sequentially displayed in the first to third time windows, the odd-numbered sub-images 1, 3, 5, and 7 are then sequentially displayed in the fourth to seventh rime windows.

Figure 19:
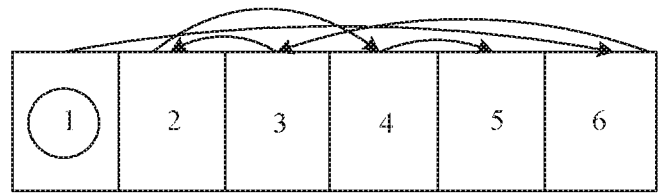
FIG. 19 is a diagram illustrating a displaying sequence of multiple sub-images in some embodiments.

In some embodiments, the N sub-images include $1^{st}$ to N-th sub-images sequential arranged along the width direction of the frame of image; N is an even number; the N sub-images are displayed in an order of the $1^{st}$ sub-image, the N-th sub-image, (N/2)-th sub-image, a sub-image between the $1^{st}$ sub-image and the (N/2)-th sub-image, a sub-image between the (N/2)-th sub-image and the N-th sub-image, until all sub-images are displayed in $1^{st}$ to N-th time windows. FIG. 19 is a diagram illustrating a displaying sequence of multiple sub-images in some embodiments. Referring to FIG. 19, a frame of image is separated into six sub-images, the sub-image 1 is the first sub-image to be displayed. As shown in FIG. 19, the six sub-images are displayed in an order of the first sub-image, the sixth sub-image, the third sub-image, the second sub-image, the fourth sub-image, and the fifth sub-image in the first to the sixth time windows.

Figure 20:
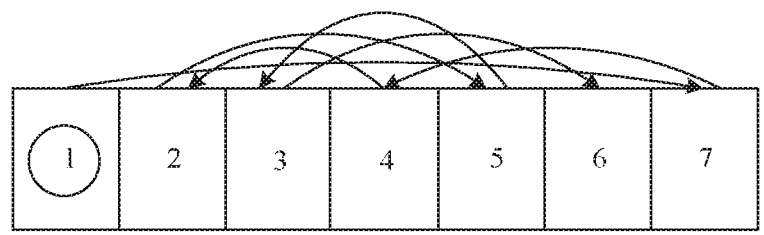
FIG. 20 is a diagram illustrating a displaying sequence of multiple sub-images in some embodiments.

In some embodiments, the N sub-images include $1^{st}$ to N-th sub-images sequential arranged along the width direction of the frame of image; N is an odd number the N sub-images are sequentially displayed in an order of the $1^{st}$ sub-image, the N-th sub-image, ((N+1)/2)-th sub-image, a sub-image between the $1^{st}$ sub-image and the ((N+1)/2)-th sub-image, a sub-image between the ((N+1)/2)-th sub-image and the N-th sub-image, until all sub-images are displayed in $1^{st}$ to N-th time windows. FIG. 20 is a diagram illustrating a displaying sequence of multiple sub-images in some embodiments. Referring to FIG. 20, a frame of image is separated into seven sub-images, the sub-image 1 is the first sub-image to be displayed. As shown in FIG. 20, the seven sub-images are displayed in an order of the first sub-image, the seventh sub-image, the fourth sub-image, the second sub-image, the fifth sub-image, the third sub-image, and the sixth sub-image in the first to the seventh time windows.

Figure 21:
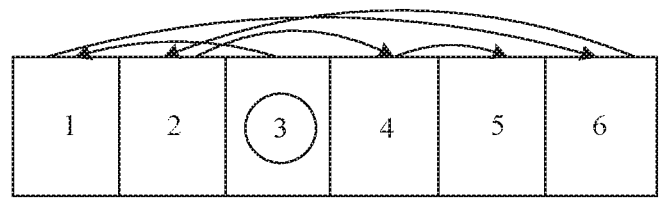
FIG. 21 is a diagram illustrating a displaying sequence of multiple sub-images in some embodiments.

In some embodiments, the N sub-images include $1^{st}$ to N-th sub-images sequential arranged along the width direction of the frame of image; N is an even number; the N sub-images are sequentially displayed in an order of (N/2)-th sub-image, the $1^{st}$ sub-image, the N-th sub-image, a sub-image between the $1^{st}$ sub-image and the (N/2)-th sub-image, a sub-image between the (N/2)-th sub-image and the N-th sub-image, until all sub-images are displayed in $1^{st}$ to N-th time windows. FIG. 21 is a diagram illustrating a displaying sequence of multiple sub-images in some embodiments. Referring to FIG. 21, a frame of image is separated into six sub-images, the sub-image 3 is the first sub-image to be displayed. As shown in FIG. 21, the six sub-images are displayed in an order of the third sub-image, the first sub-image, the sixth sub-image, the second sub-image, the fourth sub-image, and the fifth sub-image in the first to the sixth time windows.

Figure 22:
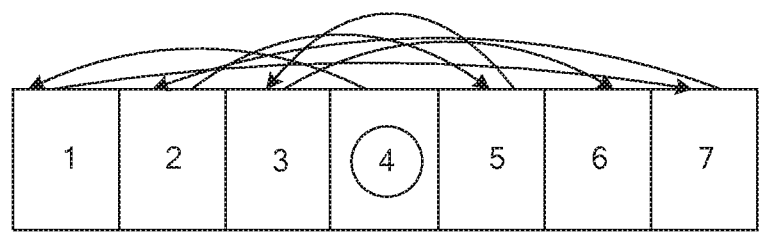
FIG. 22 is a diagram illustrating a displaying sequence of multiple sub-images in some embodiments.

In some embodiments, the N sub-images include $1^{st}$ to N-th sub-images sequential arranged along the width direction of the frame of image; N is an odd number; the N sub-images are sequentially displayed in an order of ((N+1)/2)-th sub-image, the $1^{st}$ sub-image, the N-th sub-image, a sub-image between the $1^{st}$ sub-image and the ((N+1)/2)-th sub-image, a sub-image between the ((N+1)/2)-th sub-image and the N-th sub-image, until all sub-images are displayed in $1^{st}$ to N-th time windows. FIG. 22 is a diagram illustrating a displaying sequence of multiple sub-images in some embodiments. Referring to FIG. 22, a frame of image is separated into seven sub-images, the sub-image 4 is the first sub-image to be displayed. As shown in FIG. 22, the seven sub-images are displayed in an order of the fourth sub-image, the first sub-image, the seventh sub-image, the second sub-image, the fifth sub-image, the third sub-image, and the sixth sub-image in the first to the seventh time windows.

In some embodiments, the step of configuring the N light modulators includes configuring the N light modulator so that the y-th light modulator is in the reflective optical state when a j-th sub-image is displayed in the x-th time window, y equals to N−j+1, j is an integer, and 1≤j≤N. The relationship between y and x may be determined according to a sequential displaying order as described herein. By having this design, the plurality of light modulators may display the plurality of sub-images according to their original spatial order along the width direction of the frame of image, even though the temporal order of displaying the plurality of sub-images is different from the original spatial order. For example, the first sub-image along the width direction of the frame of image is displayed by the N-th light modulator, the second sub-image along the width direction of the frame of image is displayed by the (N−1)-th light modulator, the (N−1)-th sub-image along the width direction of the frame of image is displayed by the first light modulator, the N-th sub-image along the width direction of the frame of image is displayed by the first light modulator, and so on, i.e., y equals to N−j+1. In this manner, the image perceived by an observer corresponds to the original image provided by the image display portion.

Thus, in some embodiments, the plurality of sub-images are sequentially displayed intervals as described herein. Even though during a certain time window, not all sub-images are displayed, an observer may still perceive a complete frame of image due to persistence of vision when a set of sub-images are displayed in quick succession.

In some embodiments, the N light modulators include N liquid crystal panels, each of the N liquid crystal panels includes a first polarizer, a first transparent electrode, a liquid crystal layer, a second transparent electrode and a second polarizer laminated in order; the second polarizer is a reflective polarizer disposed on a side of the first polarizer distal to the image display portion. Optionally, the step of configuring the N light modulators includes controlling an electric field between the first transparent electrode and the second transparent electrode.

In some embodiments, the first polarizer has a first transmission axis, the second polarizer has a second transmission axis, the first transmission axis being substantially perpendicular to the second transmission axis. A direction of a long axis of liquid crystal molecules in the liquid crystal layer is spirally twisted by approximately 90 degrees between the first transparent electrode and the second transparent electrode when electric field is not applied. When electric field is not applied, a direction of a long axis of liquid crystal molecules proximal to the first transparent electrode is substantially parallel to the first transmission axis, and a direction of a long axis of liquid crystal molecules proximal to the second transparent electrode is substantially parallel to the second transmission axis. Each of the N liquid crystal panels is in the reflective optical state when there is no electric field between the first transparent electrode and the second transparent electrode. Each of the N liquid crystal panels is in the transmissive optical state when a strength of the electric field is larger than a threshold value.

In some embodiments, the first polarizer has a first transmission axis, the second polarizer has a second transmission axis, the first transmission axis being substantially parallel to the second transmission axis. A long axis of liquid crystal molecules in the liquid crystal layer is substantially parallel to the first transmission axis and the second transmission axis.

In some embodiments, the N light modulators include N MEMSs, and each of the N MEMSs includes a plurality of rotatable reflectors. Optionally, the step of configuring the N light modulators includes rotating the plurality of rotatable reflectors of a MEMS to change tilt angles of the plurality of rotatable reflectors.

In some embodiments, the plurality of rotatable reflectors of the MEMS are rotated to have a substantially same tilt angle with respect to the light propagating direction so that the MEMS is in the reflective optical state. The display light reflected by the plurality of rotatable reflectors has a substantially the same propagating direction.

In some embodiments, the light modulator assembly includes a plurality of MEMSs. A plurality of rotatable reflectors of at least a first one of the plurality of MEMSs are rotated to have a first light focus point substantially coincident with a first view region. A plurality of rotatable reflectors of at least a second one of the plurality of MEMSs are rotated to have a second light focus point substantially coincident with a second view region. The second view region being different from the first view region.

In some embodiments, the light modulator assembly includes a plurality of MEMSs, and each of the plurality of MEMSs includes an array of rotatable reflectors corresponding to an array of pixels in the image display portion. Reflectors in odd columns of the array of rotatable reflectors are rotated to have a first light focus point substantially coincident with a first view region; and reflectors in even columns of the array of rotatable reflectors are rotated to have a second light focus point substantially coincident with a second view region. The second view region being different from the first view region.

In some embodiments, the image display method further includes enhancing brightness of at least one of the N sub-images so that sub-images displayed in light modulators distal to the image display portion have a higher brightness than sub-images displayed in light modulators proximal to the image display portion.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A display apparatus, comprising:
   an image display panel for displaying an image, the image display panel emitting display light along a light propagating direction; and
   a light modulator assembly comprising a first light modulator and a second light modulator arranged in series along the light propagating direction; the second light modulator having at least a reflective optical state; and the first light modulator being switchable between the reflective optical state and a transmissive optical state and being on a side of the second light modulator closer to the image display panel; a total number of light modulators including the second light modulator and any light modulator on a side of the second light modulator closer to the image display panel is N, N is an integer≥2;

wherein the N light modulators comprise N liquid crystal panels, each of the N liquid crystal panels comprises a first polarizer, a first transparent electrode, a liquid crystal layer, a second transparent electrode and a second polarizer laminated in order; the second polarizer is a reflective polarizer disposed on a side of the first polarizer distal to the image display panel; and the N liquid crystal panels comprises a plurality of curved liquid crystal panels concave toward the image display panel; at least one of the plurality of curved liquid crystal panels has a first light focus point substantially coincident with a first view region; and at least one of the plurality of curved liquid crystal panels has a second light focus point substantially coincident with a second view region; the second view region different from the first view region.

2. The display apparatus of claim 1, wherein the first polarizer has a first transmission axis, the second polarizer has a second transmission axis, the first transmission axis being substantially perpendicular to the second transmission axis;

a direction of a long axis of liquid crystal molecules in the liquid crystal layer is spirally twisted by approximately 90 degrees between the first transparent electrode and the second transparent electrode absent of electric field; and a direction of a long axis of liquid crystal molecules closer to the first transparent electrode is substantially parallel to the first transmission axis, and a direction of a long axis of liquid crystal molecules closer to the second transparent electrode is substantially parallel to the second transmission axis, absent of electric field.

3. The display apparatus of claim 1, wherein the first polarizer has a first transmission axis, the second polarizer has a second transmission axis, the first transmission axis being substantially parallel to the second transmission axis; and a long axis of liquid crystal molecules in the liquid crystal layer is substantially parallel to the first transmission axis and the second transmission axis.

4. The display apparatus of claim 1, wherein the N light modulators comprise N micro-electromechanical systems (MEMSs), each of the N MEMSs comprises a plurality of rotatable reflectors.

5. The display apparatus of claim 4, wherein the plurality of rotatable reflectors of a MEMS have a substantially the same tilt angle with respect to the light propagating direction when the MEMS is in the reflective optical state.

6. The display apparatus of claim 4, wherein the light modulator assembly comprises a plurality of MEMSs, at least a first one of the plurality of MEMSs has a first light focus point substantially coincident with a first view region; and at least a second one of the plurality of MEMSs has a second light focus point substantially coincident with a second view region; the second view region being different from the first view region.

7. The display apparatus of claim 4, wherein the light modulator assembly comprises a plurality of MEMSs, each of the plurality of MEMSs comprises an array of rotatable reflectors corresponding to an array of pixels in the image display panel; reflectors in odd columns of the array of rotatable reflectors has a first light focus point substantially coincident with a first view region; and reflectors in even columns of the array of rotatable reflectors has a second light focus point substantially coincident with a second view region; the second view region being different from the first view region.

8. An image display method, comprising:
providing an image display panel;
displaying an image by the image display panel, display light from the image display panel being emitted along a light propagating direction;
providing a light modulator assembly comprising N light modulators arranged in series along the light propagating direction;
separating a frame of image into N sub-images respectively by the N light modulators;
dividing a frame time period into N time windows corresponding to the N sub-images, respectively; and
configuring the N light modulators so that a y-th light modulator is in the reflective optical state in a x-th time window, and any light modulator on a side of the y-th light modulator closer to the image display panel is in the transmissive optical state;
wherein N is an integer≥2; x is an integer, 1≤x≤N; y is an integer, 1≤y≤N; and y=1 for the light modulator closest to the image display panel; and
the N light modulators comprises a plurality of curved liquid crystal panels concave toward the image display panel;
the image display method further comprises:
focusing light from at least one of the plurality of curved liquid crystal panels to a first light focus point substantially coincident with a first view region; and
focusing light from at least one of the plurality of curved liquid crystal panels to a second light focus point substantially coincident with a second view region; the second view region different from the first view region.

9. The method of claim 8, wherein the light modulator assembly is configured so that substantially no more than one light modulator reflects the display light at a time.

10. The method of claim 8, wherein the step of separating the frame of image into N sub-images comprises separating the frame of image into N sub-images along a width direction of the frame of image.

11. The method of claim 8, wherein the step of separating the frame of image into N sub-images comprises separating the frame of image into a first sub-image corresponding to a first view region and a second sub-image corresponding to a second view region.

12. The method of claim 8, wherein the step of separating the frame of image into N sub-images comprises separating the frame of image into N portions along a width direction of the frame of image; and further separating each of the N portions into a first sub-image corresponding to a first view region and a second sub-image corresponding to a second view region.

13. The method of claim 10, wherein the step of configuring the N light modulators comprises configuring the N light modulator so that the y-th light modulator is in the reflective optical state when a j-th sub-image is displayed in the x-th time window, y equals to N−j+1, j is an integer, and 1≤j≤N.

14. The method of claim 8, wherein the N light modulators comprise N liquid crystal panels, each of the N liquid crystal panels comprises a first polarizer, a first transparent electrode, a liquid crystal layer, a second transparent electrode and a second polarizer laminated in order; the second polarizer is a reflective polarizer disposed on a side of the first polarizer distal to the image display panel; and the step of configuring the N light modulators comprises controlling an electric field between the first transparent electrode and the second transparent electrode.

15. The method of claim 8, wherein the N light modulators comprise N MEMSs, each of the N MEMSs comprises a plurality of rotatable reflectors; and the step of configuring the N light modulators comprises rotating the plurality of rotatable reflectors of a MEMS to change tilt angles of the plurality of rotatable reflectors.

16. The method of claim 15, wherein the light modulator assembly comprises a plurality of MEMSs, a plurality of rotatable reflectors of at least a first one of the plurality of MEMSs are rotated to have a first light focus point substantially coincident with a first view region; and a plurality of rotatable reflectors of at least a second one of the plurality of MEMSs are rotated to have a second light focus point substantially coincident with a second view region; the second view region being different from the first view region.

17. The method of claim 15, wherein the light modulator assembly comprises a plurality of MEMSs, each of the plurality of MEMSs comprises an array of rotatable reflectors corresponding to an array of pixels in the image display panel; reflectors in odd columns of the array of rotatable reflectors are rotated to have a first light focus point substantially coincident with a first view region; and reflectors in even columns of the array of rotatable reflectors are rotated to have a second light focus point substantially coincident with a second view region; the second view region being different from the first view region.

18. The method of claim 8, further comprising enhancing brightness of at least one of the N sub-images so that sub-images displayed in light modulators distal to the image display panel have a higher brightness than sub-images displayed in light modulators closer to the image display panel.

\* \* \* \* \*